United States Patent
Moroff et al.

(10) Patent No.: US 11,014,206 B2
(45) Date of Patent: May 25, 2021

(54) DEVICE FOR EXCHANGING PART OF TOOL AND HOLLOW MILLING TOOL

(71) Applicant: MOROFF & BAIERL GMBH, Hermaringen (DE)

(72) Inventors: Wolfgang Albrecht Moroff, Giengen-Huerben (DE); Martin Mueller, Heidenheim-Oggenhausen (DE)

(73) Assignee: MOROFF & BAIERL GMBH, Hermaringen (DE)

( * ) Notice: Subject to any disclaimer, the term of this patent is extended or adjusted under 35 U.S.C. 154(b) by 201 days.

(21) Appl. No.: 16/170,372

(22) Filed: Oct. 25, 2018

(65) Prior Publication Data

US 2019/0126417 A1 May 2, 2019

(30) Foreign Application Priority Data

Oct. 27, 2017 (DE) ...................... 10 2017 125 316.5

(51) Int. Cl.
*B23Q 3/157* (2006.01)
*B23C 5/04* (2006.01)

(52) U.S. Cl.
CPC ............ *B23Q 3/15766* (2013.01); *B23C 5/04* (2013.01); *B23Q 3/157* (2013.01); *B23B 2205/215* (2013.01); *B23C 2210/02* (2013.01); *B23C 2240/32* (2013.01); *Y10T 483/1712* (2015.01)

(58) Field of Classification Search
CPC ........... B23B 2205/21; B23B 2205/215; Y10T 483/1712; Y10S 483/901; Y10S 901/41
USPC ...................................... 483/21, 901; 901/41
See application file for complete search history.

(56) References Cited

U.S. PATENT DOCUMENTS

| | | | | |
|---|---|---|---|---|
| 4,207,504 A | * | 6/1980 | Kawada | B23Q 15/26 318/561 |
| 4,345,192 A | * | 8/1982 | Kohzai | G05B 19/39 318/592 |
| 4,632,612 A | * | 12/1986 | Loerch | G05B 19/351 408/9 |
| 5,059,492 A | | 10/1991 | Shindou et al. | |

(Continued)

FOREIGN PATENT DOCUMENTS

| | | |
|---|---|---|
| DE | 298 09 638 U1 | 9/1998 |
| DE | 202 15 460 U1 | 2/2003 |

(Continued)

OTHER PUBLICATIONS

Bornemann Machinenbau GmbH, Aug. 2016.
German Office Action Corresponding to 10 2017 125 316.5 dated Jul. 11, 2018.

*Primary Examiner* — Erica E Cadugan
*Assistant Examiner* — Michael Vitale
(74) *Attorney, Agent, or Firm* — Finch & Maloney PLLC; Michael J. Bujold

(57) ABSTRACT

A device (1) for exchanging at least one cutting component (2a) of a rotating tool (2), in particular a milling tool (2), and more particularly, a hollow milling tool for machining workpieces made of plastic. The device has an aligning device (5) for orientating a position of the cutting component (2a) relative to a rotational axis (2c) of the tool (2) and an exchanging device (6) for releasing the cutting component (2a) from a part (2b) that remains on the tool (2) and for attaching another cutting component (2a) to the part (2b) that remains on the tool (2).

11 Claims, 17 Drawing Sheets

(56) References Cited

U.S. PATENT DOCUMENTS

| | | | |
|---|---|---|---|
| 6,030,326 A * | 2/2000 | Azuma | B27B 5/32 |
| | | | 483/31 |
| 7,267,642 B2 * | 9/2007 | Arai | B23Q 3/1554 |
| | | | 483/3 |
| 8,066,457 B2 * | 11/2011 | Buettiker | B23B 31/1107 |
| | | | 409/234 |
| 9,573,201 B2 | 2/2017 | Best et al. | |
| 9,604,331 B2 * | 3/2017 | Noma | B25J 11/005 |
| 2004/0005973 A1 * | 1/2004 | Momochi | B23Q 3/15553 |
| | | | 483/1 |
| 2009/0176636 A1 * | 7/2009 | Hayashi | B23Q 3/15706 |
| | | | 483/1 |
| 2015/0165530 A1 | 6/2015 | Maurer | |
| 2015/0290718 A1 * | 10/2015 | Freyermuth | F16D 1/108 |
| | | | 279/100 |

FOREIGN PATENT DOCUMENTS

| | | | |
|---|---|---|---|
| DE | 102 55 270 A1 | 6/2004 | |
| DE | 103 56 731 B3 | 3/2005 | |
| DE | 10 2013 110 129 A1 | 3/2015 | |
| EP | 0437322 A2 * | 7/1991 | B23P 11/027 |
| EP | 2 933 047 A1 | 10/2015 | |
| JP | 53134288 A * | 11/1978 | |
| JP | 61260953 A * | 11/1986 | B23B 27/00 |
| JP | 62074541 A * | 4/1987 | B23Q 3/15513 |

\* cited by examiner

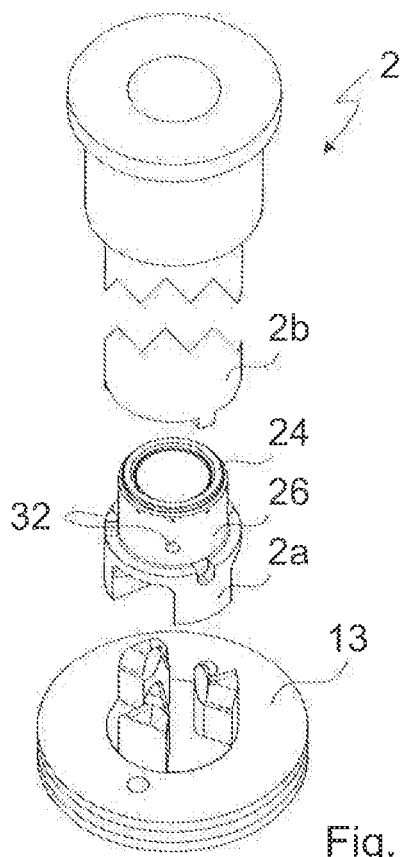
Fig. 20
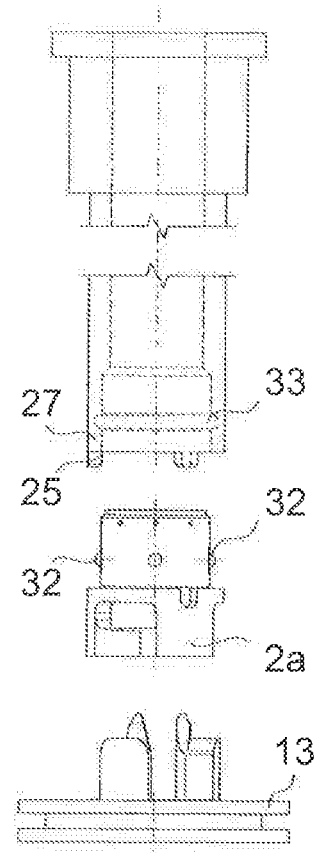
Fig. 21
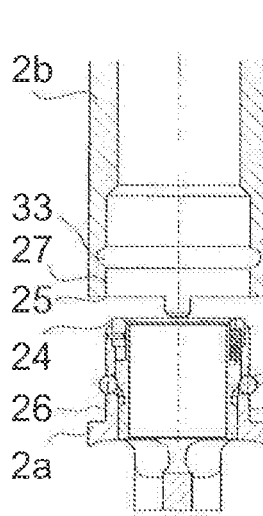 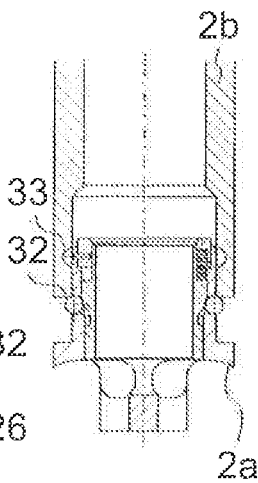 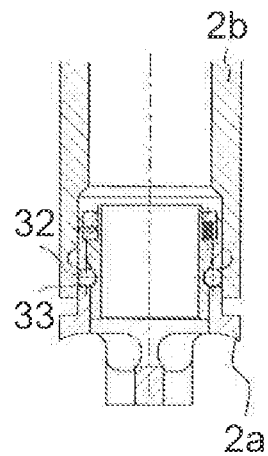 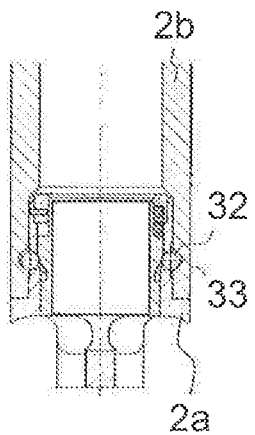
Fig. 22A  Fig. 22B  Fig. 22C  Fig. 22D

DEVICE FOR EXCHANGING PART OF TOOL AND HOLLOW MILLING TOOL

This application claims priority from German patent application serial no. 10 2017 125 316.5 filed Oct. 27, 2017.

FIELD OF THE INVENTION

The invention relates to a device for exchanging at least one cutting component of a rotating tool, in particular a milling tool, in particular a hollow milling tool for machining workpieces made of plastic. In addition the invention relates to a hollow milling tool for machining workpieces made of plastic.

BACKGROUND OF THE INVENTION

In the production of freeform surfaces by milling tools, for example for producing casting molds for finished concrete objects, it is often the case that various machining operations of the material are needed. For this purpose in most cases different tools are used, since not all milling tools are suitable for all the various machining steps. With the machining machines used for the purpose it is therefore often necessary to exchange the tools, and this is normally carried out manually by an operator. That demands not only high expenditure but sometimes also the use of substantial force by the operator, since the exchangeable cutting components of these tools sometimes become very tightly gripped by the non-exchangeable part of the tool during machining. Furthermore the manual exchange of the cutting component of the tool takes a lot of time and this, understandably, increases the costs incurred by machining with such tools.

An alternative to the procedure described would be to equip a milling machine with a plurality of spindles and correspondingly many tools. However, that would considerably increase the cost of the machine as a whole.

SUMMARY OF THE INVENTION

The purpose of the present invention, therefore, is to provide a device for exchanging at least one cutting component of a rotating tool, which enables at least the cutting component to be exchanged in a simple manner.

According to the invention, this objective is achieved by the characteristics specified in the independent claims.

The device according to the invention comprises an aligning device with which the position of the cutting component can be aligned relative to the rotational axis of the tool and thus also relative to the rotational position of the tool itself, so that in a simple manner an exchanging device used after the alignment can engage in the cutting component and release it from the part that remains on the tool.

This provides a very simple device that can be used with little effort, with which at least the cutting component of a rotating tool can be exchanged. This simplifies not only the exchange itself, but also allows substantial automation of the machining of components with such a tool.

To simplify the releasing and attachment of the cutting component from or to the part that remains on the tool, in a very advantageous further development of the invention a holding device for holding the part that remains on the tool can be provided.

If in such a case the holding device is in the form of a floating clamping device, the part remaining on the tool can be held in a simple way.

Alternatively it can also be provided that the holding device is a locking device for a tool drive unit. In this way too the part that remains on the tool can be held fast so that the cutting component can be exchanged.

In order to release the cutting component from the part that remains on the tool or to attach it thereto in as simple a manner as possible, it can also be provided that the exchanging device has at least one engagement element for engaging in the cutting component.

To simplify the releasing of the cutting component still further, it is also advantageous for the exchanging device to comprise a drive unit for rotating the at least one engagement element. This enables particularly simple release and attachment of the cutting component.

In a further advantageous embodiment of the invention it can be provided that the exchanging device comprises means for moving the at least one engagement element in the direction of the rotational axis of the tool. In this way the at least one engagement element can be moved to the desired position very rapidly and with little effort.

In order to be able to apply some force when attaching the cutting component to the part that remains on the tool and also to assist the release of the cutting component, it can additionally be provided that the means for moving the at least one engagement element in the direction of the rotational axis of the tool have a spring element for exerting force in the direction of a longitudinal axis of the tool. Such a spring element can for example be in the form of a pneumatic cylinder-piston unit or pneumatic cylinder.

To simplify the exchange of the cutting component, it can further be provided that the exchanging device comprises two engagement elements that can be moved relative to the tool by means of a displacement device.

If moreover the aligning device comprises at least one positioning element for positioning the cutting component to be exchanged in a particular position around the rotational axis of the tool, this makes it possible in a simple manner to align the position of the cutting component about the rotational axis of the tool.

To facilitate the positioning of the cutting component in its position around the rotational axis of the tool, it can also be provided that the aligning device comprises means for determining the angular position of the tool.

The claims describe a hollow milling tool for machining workpieces made of plastic, which comprises an exchangeable cutting component which can be exchanged particularly simply by means of the device according to the invention, so that such a tool can be used very advantageously in combination with the device according to the invention.

To be able to release the cutting component in a simple way from the part that remains on the tool, or attach it to the same, it can be provided that the cutting component and the part remaining on the tool are connected to one another by a screw connection, by a bayonet connection or by means of a locking ball connection.

BRIEF DESCRIPTION OF THE DRAWINGS

Below, an example embodiment of the invention is illustrated with reference to the drawings, which show:

FIG. 20: A third embodiment of a hollow milling tool according to the invention;

FIG. 21: A side view of the milling tool in FIG. 20; and

FIGS. 22A-22D: Various conditions during the connection of the cutting component to the part remaining on the tool, in the case of the milling tool according to FIG. 20.

DETAILED DESCRIPTION OF THE PREFERRED EMBODIMENTS

Figure 1:
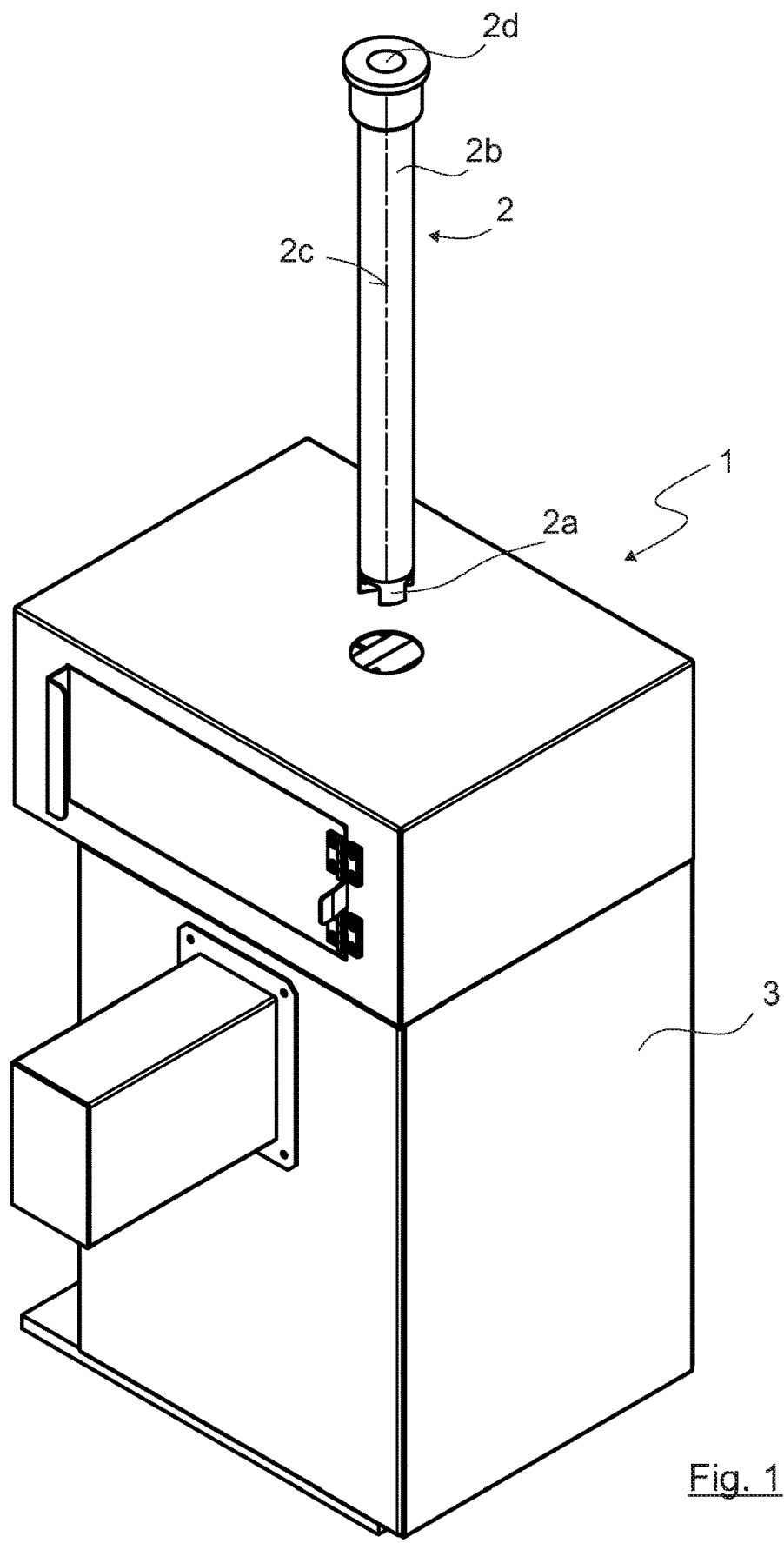
FIG. 1: A perspective view of a device according to the invention.

FIG. 1 shows a device 1 for exchanging at least one cutting component 2a of a rotating tool 2. In this case the tool 2 is a milling tool, in particular a hollow milling tool for machining workpieces (not shown) made of plastic, in particular also foamed plastics such as foamed polystyrol. The cutting component 2a, with which the actual machining of the workpiece is carried out, can be removed from a part 2b that remains on the tool 2 by means of the device 1 described below, and can be replaced by a new or different cutting component 2a.

The tool 2 has a bore 2d extending throughout its length in the direction of its rotational axis 2c, through which the swarf removed from the workpiece being machined can be conveyed.

In the representation of FIG. 1, the device 1 has a housing 3 which serves to protect the individual parts of the device 1 and to protect the operators (not shown).

Figure 2:
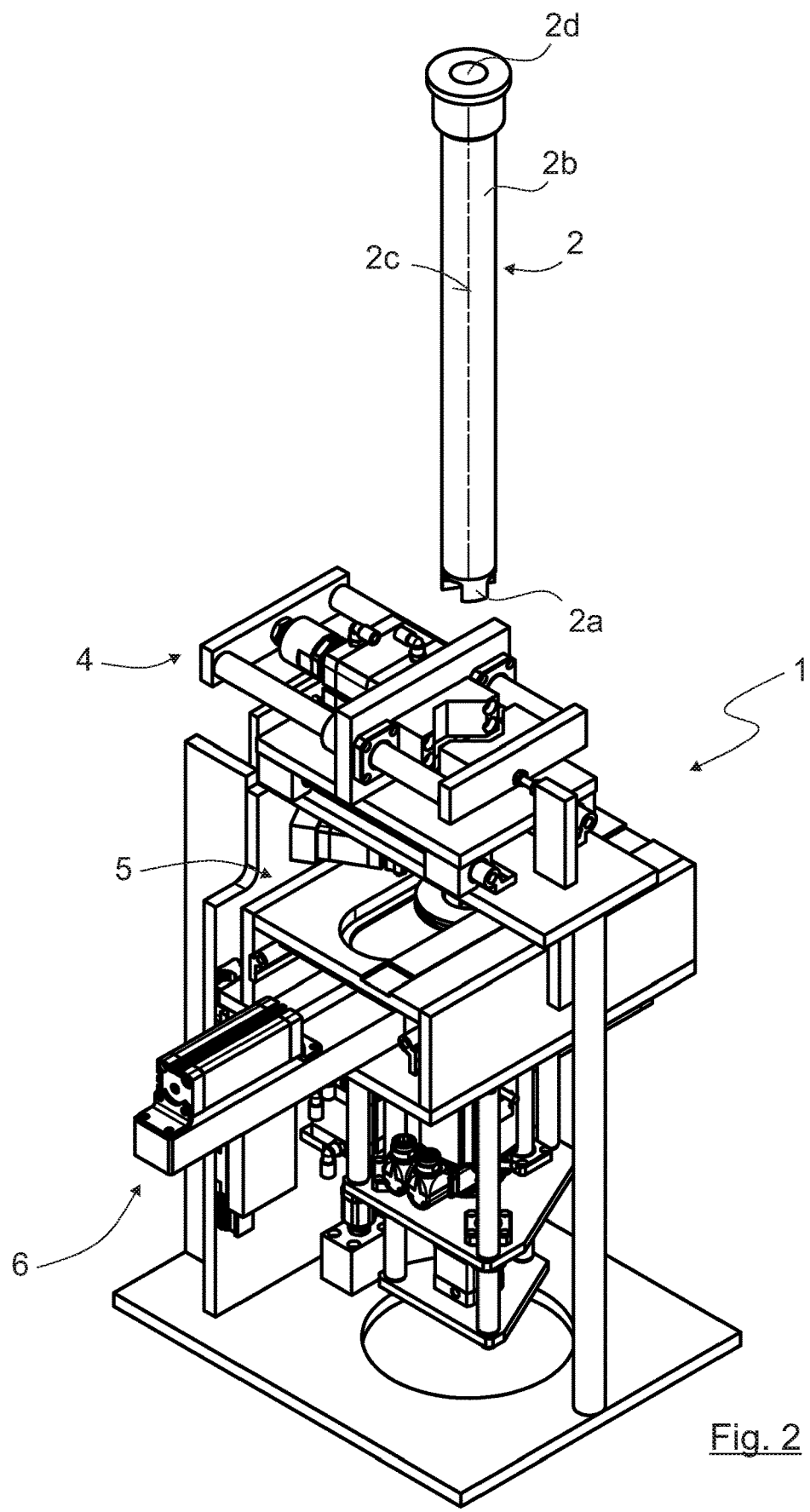
FIG. 2: Another view of the device in FIG. 1.

FIG. 2 shows the device 1 without its housing 3. Individual parts of the device 1 can be seen, which will be described in greater detail in what follows: thus, the device 1 has a holding device 4 at the top, provided in the area facing toward the tool 2, which serves to hold the part 2b that remains on the tool 2 in order to prevent it from rotating and thereby to enable the cutting component 2a to be released from the part 2b that remains on the tool 2 or another cutting component 2a to be attached to it. Under the holding device 4, i.e. on its side facing away from the tool 2, there is an aligning device 5 that serves to orientate a position of the cutting component 2a about the rotational axis 2c of the tool 2. In the representation shown as FIG. 2, the aligning device 5 can only be seen partially, but it is shown in detail in FIG. 5. Under the aligning device 5 is arranged an exchanging device 6, which serves to release at least the cutting component 2a from the part 2b that remains on the tool 2 and to attach another cutting component 2a to the part 2b that remains on the tool 2.

Figure 3:
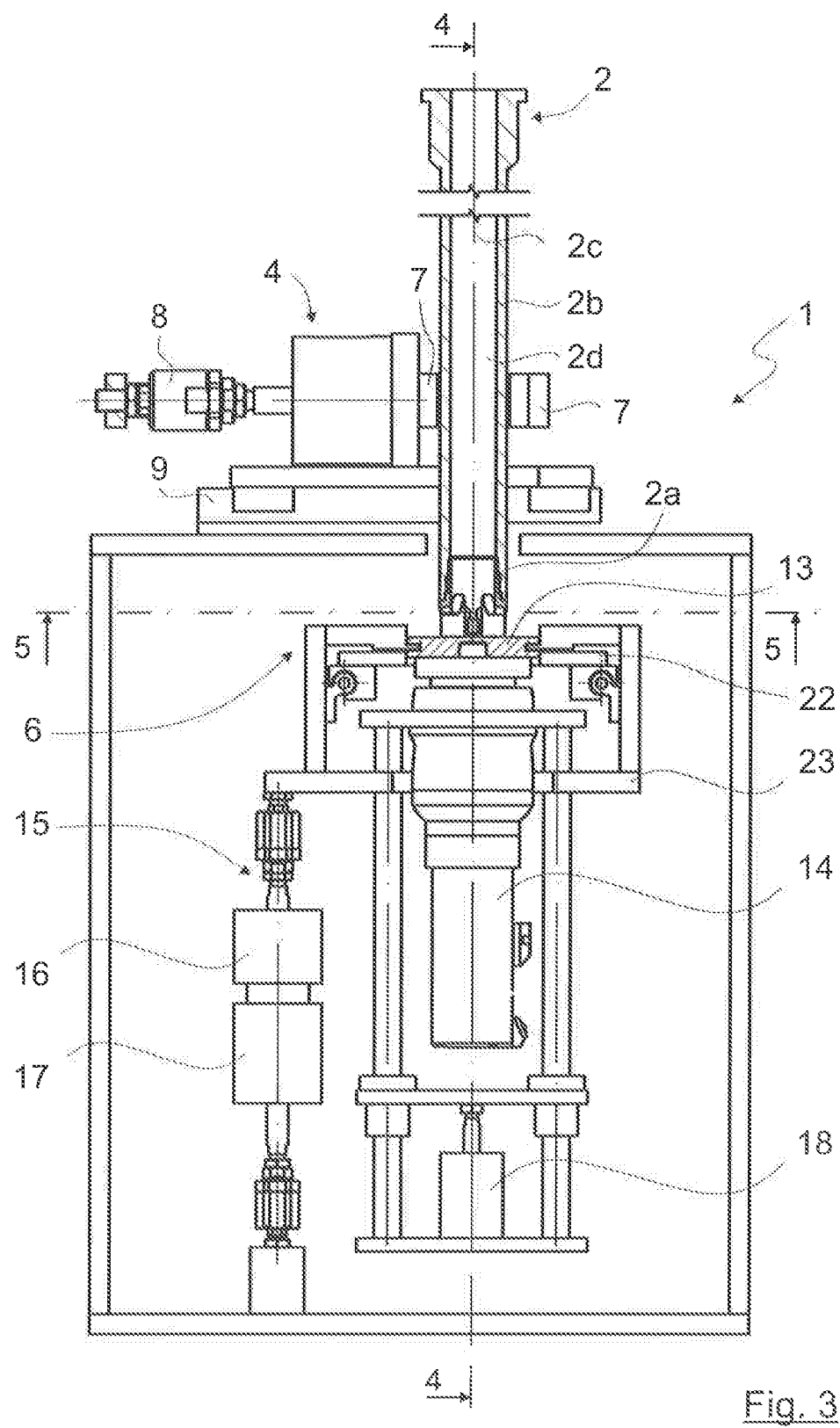
FIG. 3: The device in FIG. 2, sectioned along the line 3-3 in FIG. 4.
Figure 4:
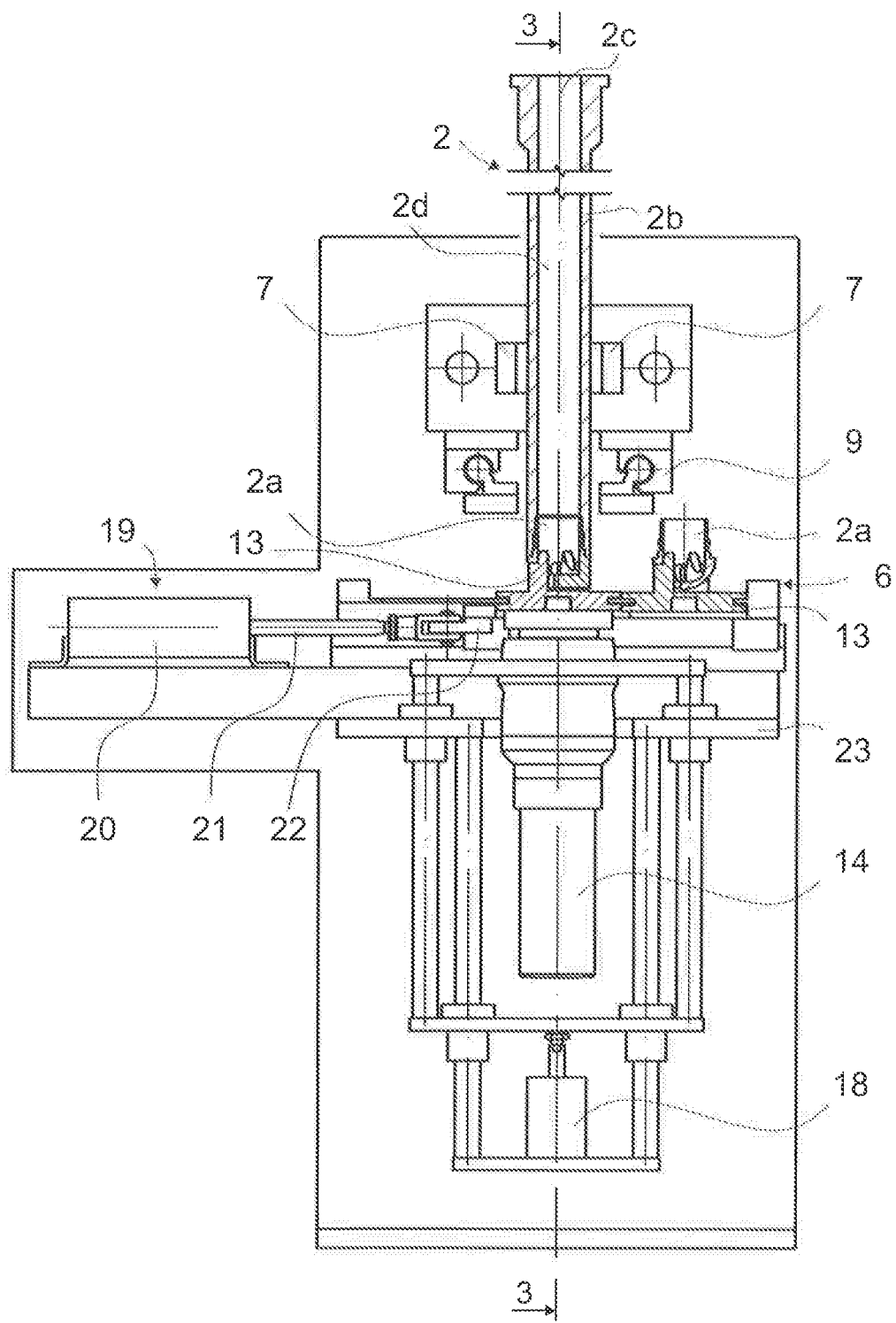
FIG. 4: A section along the line 4-4 in FIG. 3.
Figure 5:
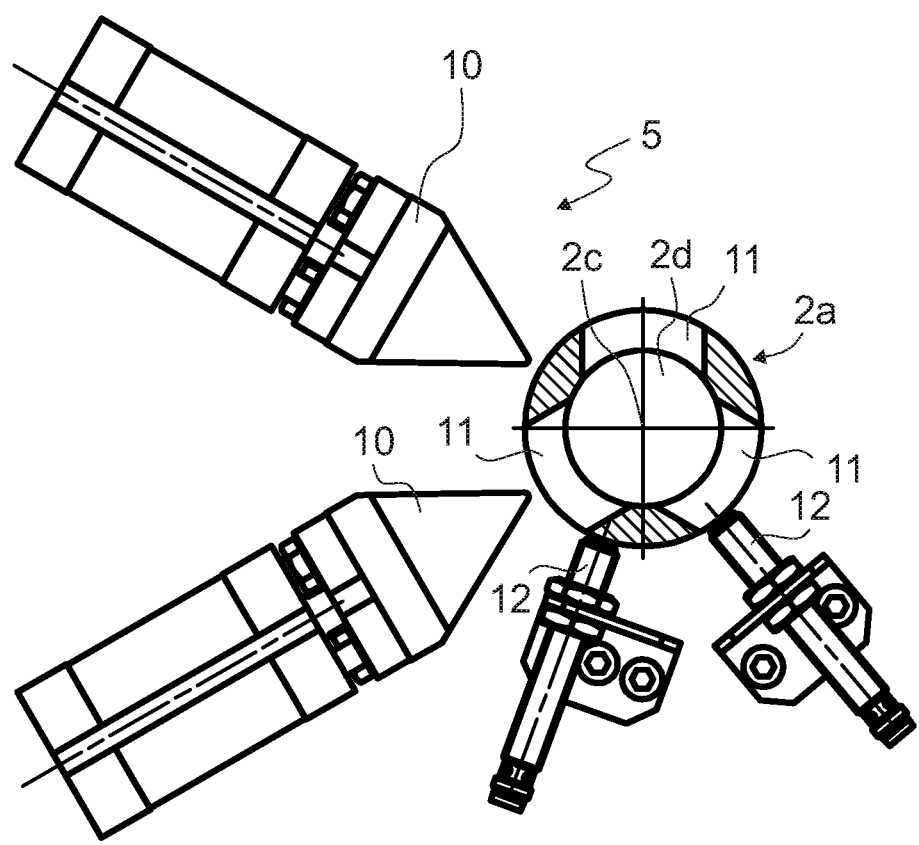
FIG. 5: A section along the line 5-5 in FIG. 3.

Referring to FIGS. 3 to 5, the individual components of the device 1 and its holding device 4, aligning device 5 and exchanging device 6 will now be described in greater detail.

In this example embodiment, as can be seen in FIGS. 3 and 4, the holding device 4 is in the form of a floating clamping device. It comprises two clamping jaws 7 between which the tool 2 can be introduced. The clamping jaws 7 can be moved by an actuating device 8 between an open and a closed position, such that in the closed position the part 2b that remains on the tool 2 is clamped between the clamping jaws 7. The clamping jaws 7 are mounted in a floating manner on a sliding carriage 9 so that on closing they are self-centering. In this way, during the clamping of the tool 2 between the clamp jaws 7 any bending of the tool 2 or, more generally, the exertion of too large a force on it which could cause the tool 2 to become misaligned with respect to its rotational axis 2c, is prevented. The clamping jaws 7 can be fitted with plastic inserts to prevent damage to the tool 2.

Alternatively to the embodiment of the holding device 4 shown, it would also be possible to design it as a locking device for a drive unit (not shown) of the tool 2, for example an electric motor. Such a locking device could even be a brake integrated in the electric motor.

The aligning device 5 shown in more detail in FIG. 5 has at least one, in this case two positioning elements 10, which are provided in order to engage in the cutting component 2a. In this embodiment the cutting component 2a has three openings 11 spaced at intervals of 120°, in which the positioning elements 10 can engage. The aligning device 5 is not shown in FIGS. 3 and 4 for the sake of clarity.

In FIG. 5, which shows the cutting component 2a in cross-section, the arrangement of the positioning elements 10 of the aligning device 5 relative to the cutting component 2a is shown. In the present case, the positioning elements 10 are wedge-shaped and can be moved in the direction toward the cutting component 2a and away from it by means of the pneumatic cylinders associated with them. The position of the cutting component 2a around the rotational axis 2c of the tool 2 can be fixed by moving one of the positioning elements 10 toward the cutting component 2a. During this, relative to the cutting component 2a the positioning elements 10 are arranged in such manner that in no position of the cutting component 2a is it possible for the two positioning elements 10 to engage in respective openings 11 thereof, and in any position of the cutting component 2a it is ensured that one of the positioning elements 10 can engage in one of the openings 11. Thus, in other embodiments of the cutting component 2a it can be necessary for the positioning elements 10 to be arranged differently and/or for more positioning elements 10 to be provided.

If the positioning element 10 encounters a wall section of the cutting component 2a, i.e. not an opening 11, the positioning element 10 concerned moves back and another positioning element 10 moves toward the cutting component 2a. In the example shown in FIG. 5 the upper positioning element 10 would encounter a wall of the cutting component 2a, whereas in contrast the lower positioning element 10 could move into one of the openings 11. It is clear that due to the wedge shape of the positioning elements 10 a particular orientation of the cutting component 2a and hence of the tool 2 as a whole can be reached when the drive unit of the tool 2 is idling and accordingly allows the tool 2 to rotate about the rotational axis 2c. In this way, with the help of the positioning elements 10 the aligning device 5 can ensure an exact orientation of the position of the cutting component 2a and hence of the tool 2 as a whole about its rotational axis 2c.

Furthermore, in the present case the alignment device 5 comprises means in the form of proximity sensors 12 for determining the angular position of the tool 2. In a way known as such, the proximity sensors 12 can determine whether one of the openings 11 or a wall of the cutting component 2a is in front of it. This also makes it possible to select that positioning element 10 to move toward the cutting component 2a whose position is such that it can engage in one of the openings 11, so that collisions of the positioning elements 10 with the wall of the cutting component 2a can be avoided. Needless to say, other design forms of the means 12 for determining the angular position of the tool 2 are also conceivable.

The exchanging device 6, which is used for releasing at least the cutting component 2a from the part 2b that remains on the tool 2 and for attaching another cutting component 2a to the part 2b that remains on the tool 2, is shown in detail in particular in FIG. 3. This comprises at least one, in the present case two engaging elements 13 that serve to engage in the cutting component 2a and for that purpose are adapted to the shape of the cutting component 2a concerned. Thus, there is a form fit between the engaging element 13 and the cutting component 2a. In the present case the engaging elements 13 engage from underneath in the central bore 2d of the tool 2, which is also in the cutting component 2a. The engaging elements 13 are adapted to the contour of the cutting component 2a so that by rotating the engagement elements 13, the cutting component 2a can be released from the tool 2. Correspondingly, by rotating the engaging element 13 concerned in the opposite direction another cutting component 2a can be connected again to the part 2b that remains on the tool 2. The manner of this rotation depends on the design of the connection between the part 2b that remains on the tool 2 and the cutting component 2a. That connection will be described in greater detail later, with reference to a number of example embodiments.

To enable the rotation of the engaging elements 13, in the example embodiment shown the engaging device 6 comprises a drive unit 14 for rotating the at least one engaging element 13. In the present case the drive unit 14 is an electric motor, which in a manner known as such can be connected to the engaging element 13 concerned.

To be able to bring the engaging element 13 into and out of engagement with the cutting component 2a, the exchanging device 6 also has means 15 for moving the at least one engaging element 13 in the direction of the rotational axis 2c of the tool 2. In the present case these means 15 move the whole drive unit 14 along with the engaging element 13 connected thereto, and comprise two spring elements 16 and 17 each in the form of a pneumatic cylinder. The spring element 16 can apply force in the direction toward the rotational axis 2c of the tool 2. In addition a spring element 18 also in the form of a pneumatic cylinder is provided, whose function will be explained later. Instead of the pneumatic cylinder a compression spring could also be used as the spring element 18. If necessary the force or spring constant of the spring elements 16, 17 and/or 18 can be adjustable.

Furthermore the exchanging device 6 has a displacement device 19 by which the engaging elements 13 can be displaced in a direction perpendicular to the rotational axis 2c of the tool 2, i.e. in a horizontal direction. In this case the displacement device 19 comprises a further pneumatic cylinder 20, which is connected, via a tie-rod 21, to a support 22 which is located between the engaging element 13 and the drive unit 14 and on which the engaging elements 13 can rest.

FIGS. 6 to 14 show a number of conditions during the changing of the cutting component 2a of the tool 2.

Figure 6:
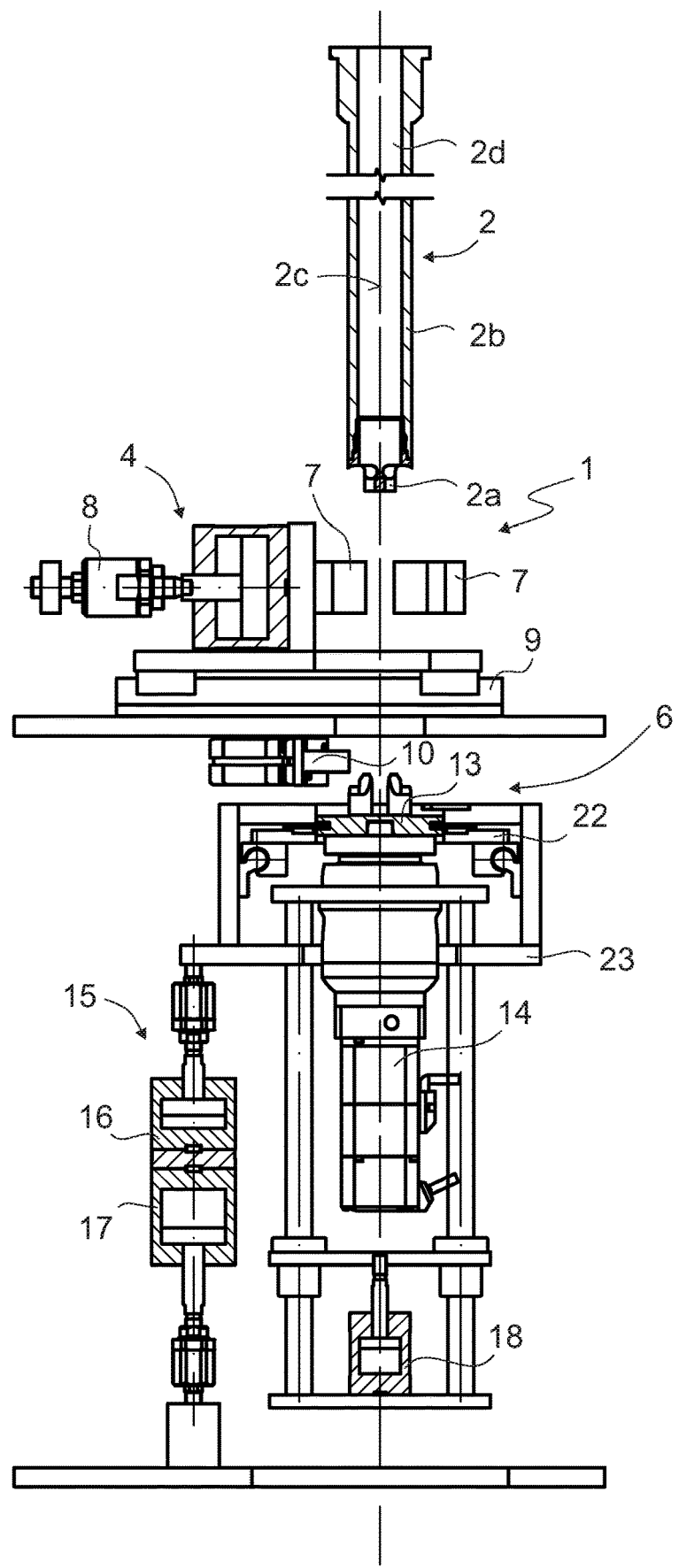
FIG. 6: A view of the device according to the invention according to FIG. 3, in a first process step.

FIG. 6 shows the device 1 in the condition in which the tool 2 is moving toward the device 1. Accordingly, in the condition shown in FIG. 6 the device 1 is ready to receive the tool 2. For this the holding device 4 is open, i.e. the two clamping jaws 7 are in positions a distance apart from one another so that the tool 2 can move between them.

Figure 7:
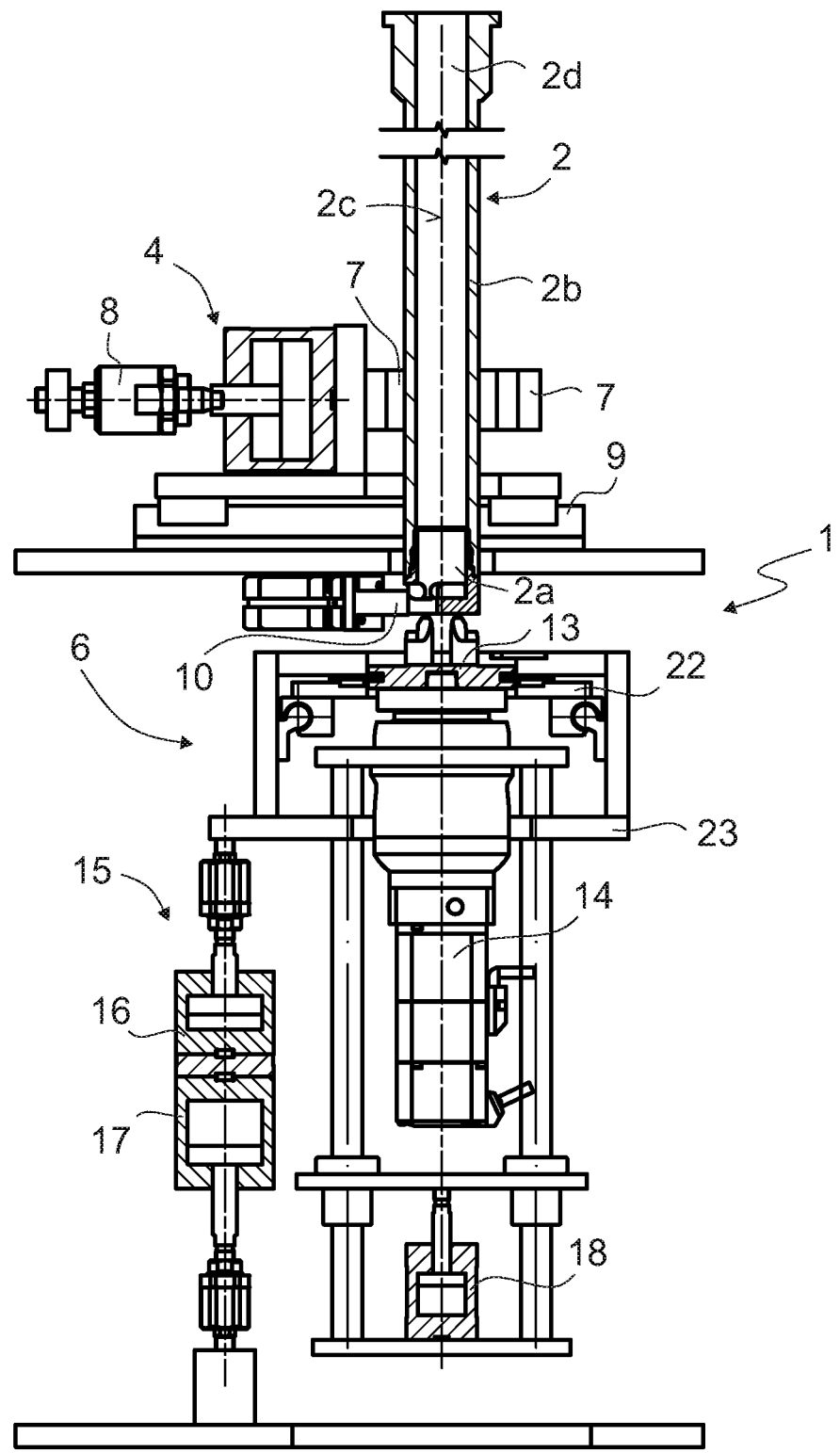
FIG. 7: The device of FIG. 6 in a second process step.

In the condition shown in FIG. 7 the tool 2 has moved into the holding device 4 but the clamping jaws 7 are still in their open condition. In this position, by means of the aligning device 5 the position of the cutting component 2a and hence that of the tool 2 as a whole can be orientated about the rotational axis 2c. Here, however, the two positioning elements 10 are still outside the cutting component 2a.

Figure 8:
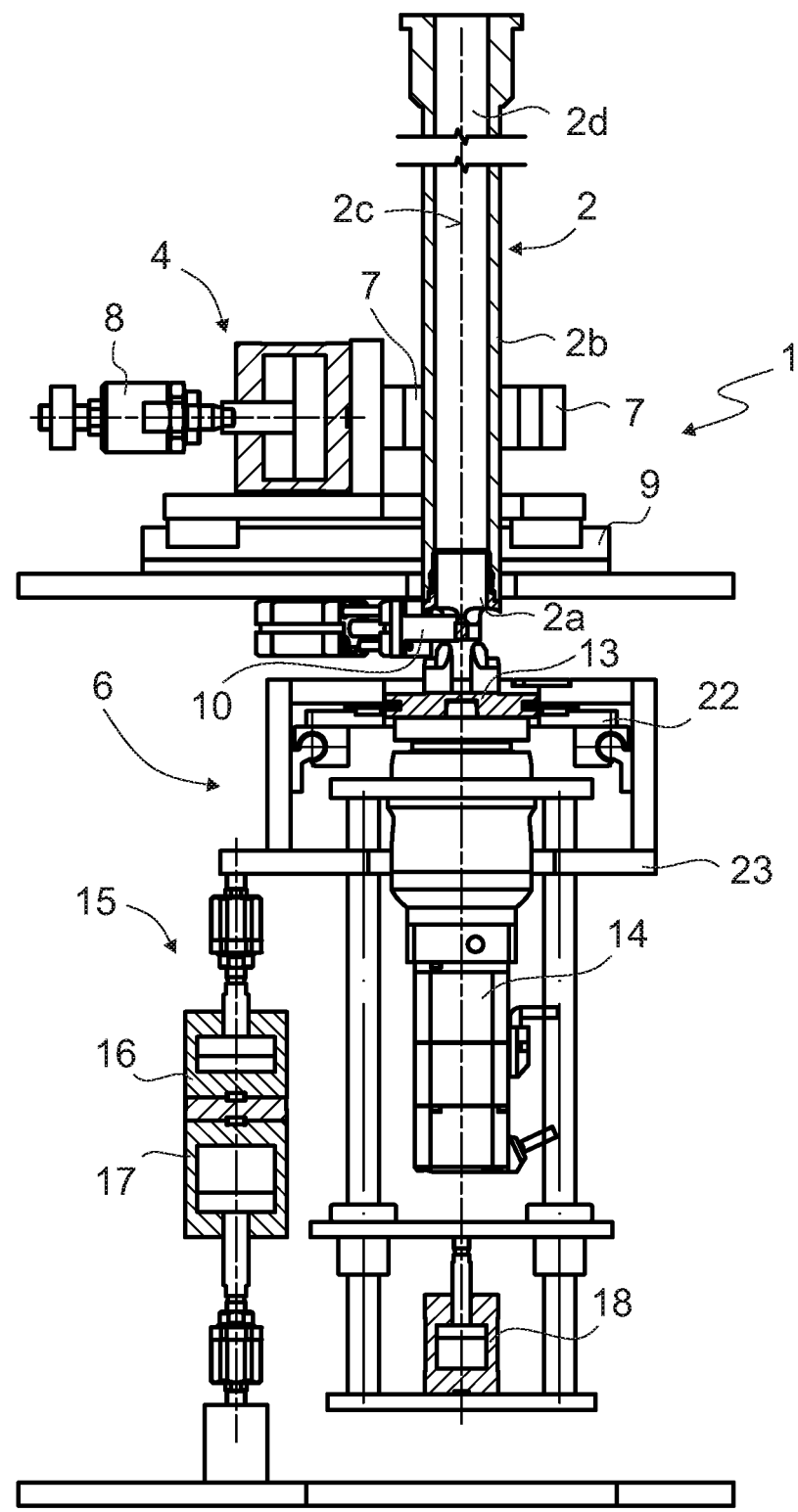
FIG. 8: The device of FIG. 6 in a third process step.

In FIG. 8 the positioning element 10 has been moved into an opening 11 (not visible in this figure) in the cutting component 2a and the cutting component 2a and hence the tool 2 as a whole are rotated about the rotational axis 2c to the desired position relative to the rotational axis 2c. In this condition too, the holding device 4 is still open in order to enable the rotation of the tool 2.

Figure 9:
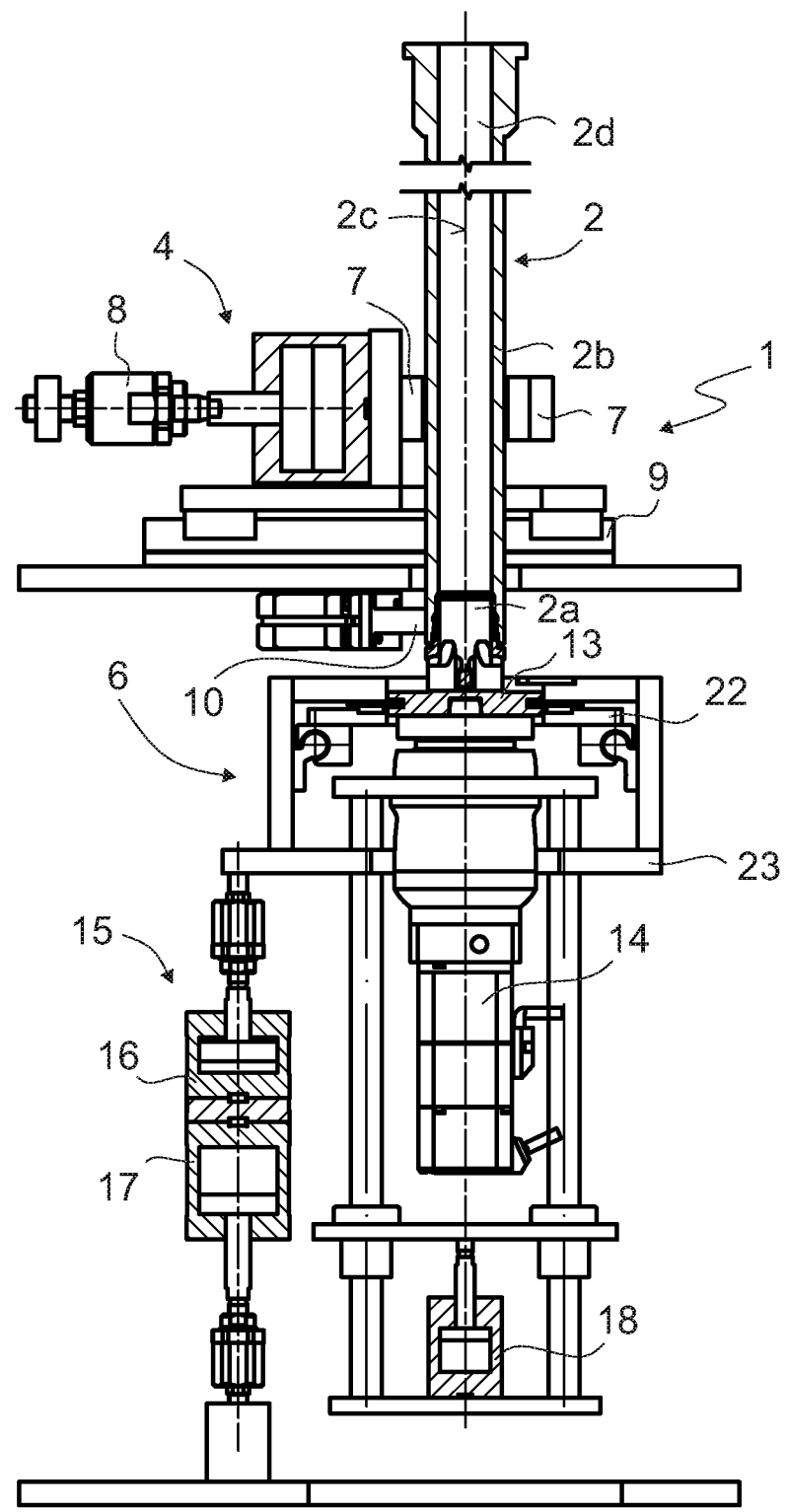
FIG. 9: The device of FIG. 6 in a fourth process step.

Thereafter, in the step shown in FIG. 9 the tool 2 moves farther into the device 1 in the direction of its rotational axis 2c, until the engaging element 13 engages in the cutting component 2a. The positioning of the tool 2 relative to its rotational axis 2c established in the step illustrated in FIG. 8 is maintained in order to ensure that in the next step the engaging element 13 can move correctly into the cutting component 2a. In this condition the holding device 4 is also closed by bringing the clamping jaws 7 into contact with the part 2b that remains on the tool 2 and applying an appropriate force. Moreover, in this condition the rotation of the engaging element 13 by means of the drive unit 14 begins, so that the cutting component 2a is released from the part 2b that remains on the tool 2. As already mentioned earlier, the possible connections between the cutting component 2a and the part 2b that remains on the tool 2 will be described in greater detail later.

In the example embodiment of the device 1 shown in FIGS. 1 to 14, for the sake of simplicity it is assumed that the cutting component 2a and the part 2b that remains on the tool 2 are connected to one another by means of a screw connection.

Figure 10:
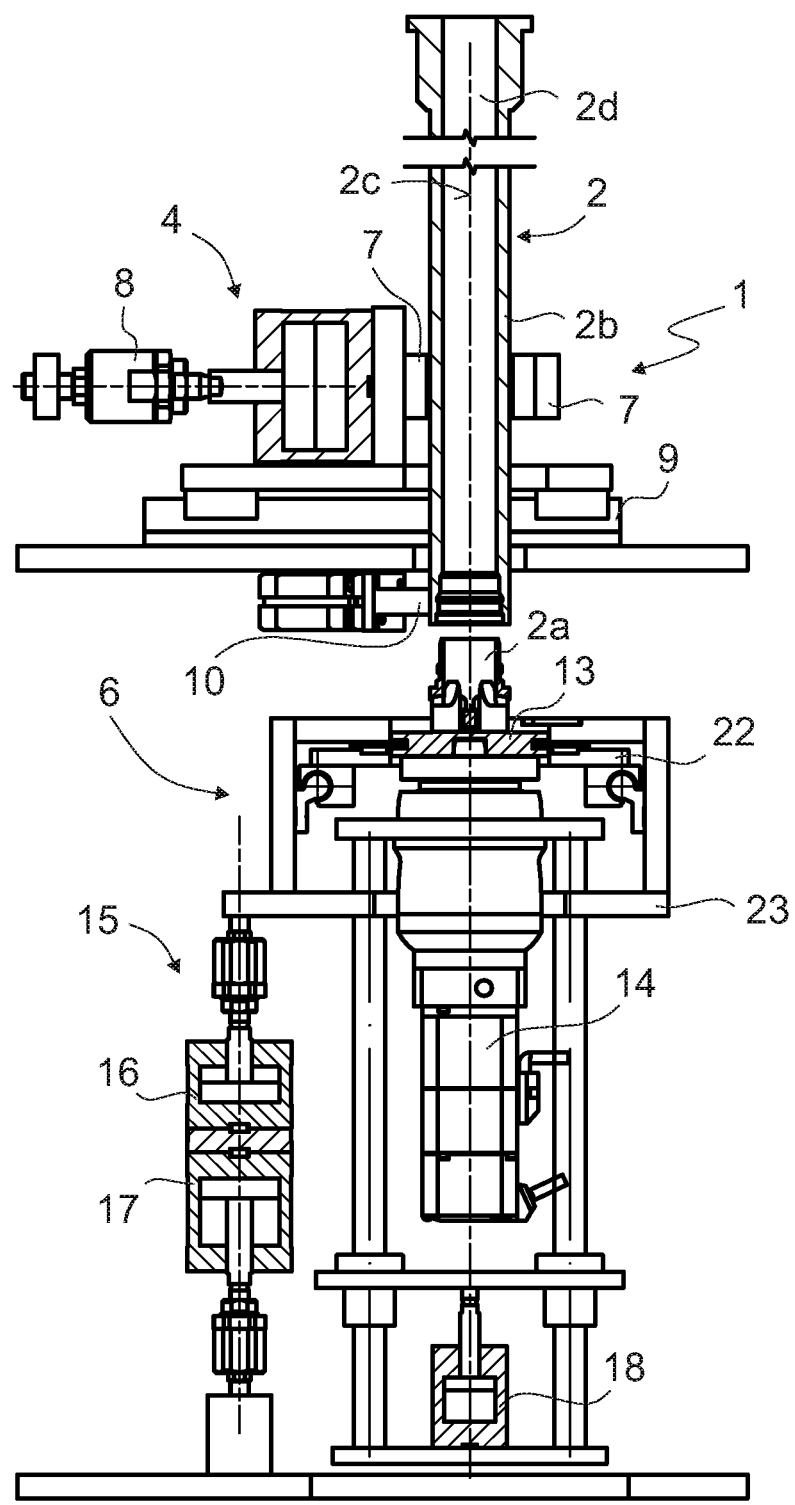
FIG. 10: The device of FIG. 6 in a fifth process step.

FIG. 10 shows the condition in which the cutting component 2a has been completely removed from the part 2b that remains on the tool 2. In other words, in FIG. 10 the cutting component 2a is shown after being unscrewed and lowered. While the cutting component 2a is being unscrewed or released by rotating the engaging element 13 by means of the drive unit 14, it is also lowered against the force of the spring element 16 in the form of a pneumatic cylinder, whereby any tilting of the cutting component 2a relative to the part 2b that remains on the tool 2 is prevented.

Figure 11:
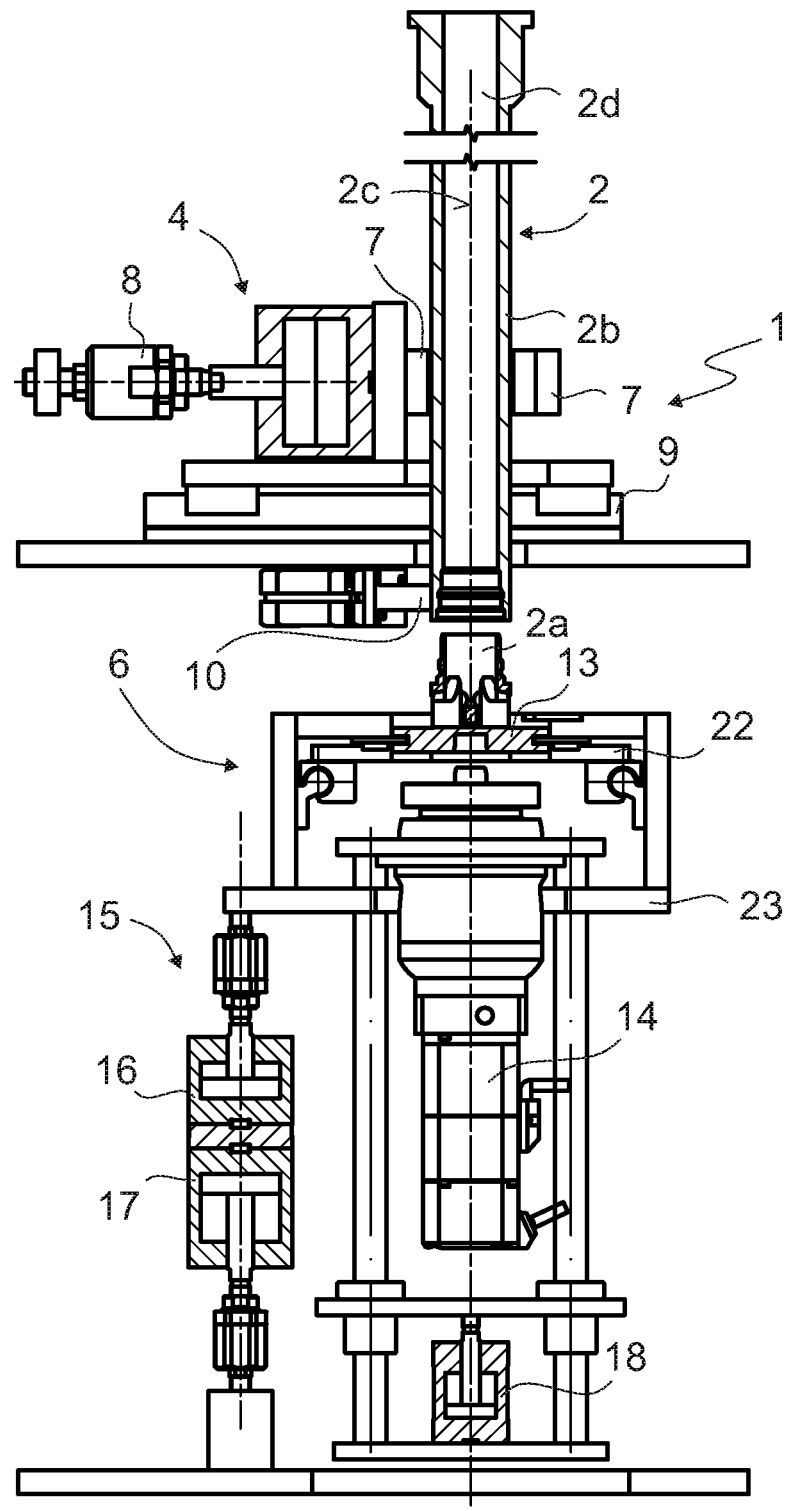
FIG. 11: The device of FIG. 6 in a sixth process step.

In the step shown in FIG. 11 the drive unit 14 is decoupled from the engaging element 13 by which the cutting component 2a was removed. The lowering of the drive unit 14 necessary for this takes place by means of the spring element 18 which is connected to the drive unit 14.

Figure 12:
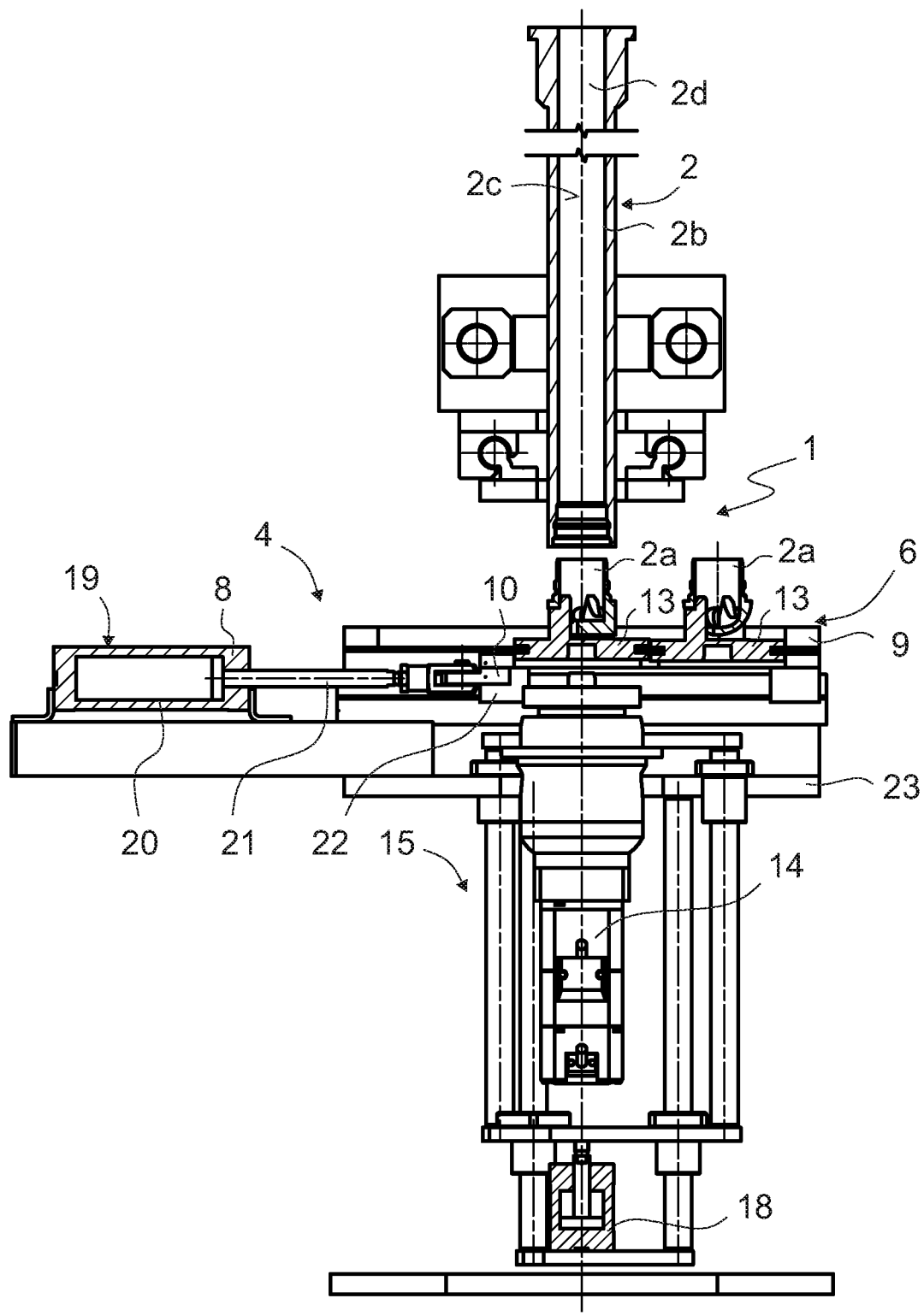
FIG. 12: The device of FIG. 6 in a seventh process step.

FIG. 12 shows the same condition as FIG. 11, but in a view rotated by 90°. This shows the position of the two engaging elements 13 relative to the tool 2. Thus, in the condition shown in FIG. 12 the cutting component 2a, removed from the part 2b that remains on the tool 2 in the previous steps, is still under the part 2b that remains on the tool 2. In an embodiment (not shown) it is also conceivable to have more than two engaging elements 13. If necessary these could also be rotated about a rotational axis instead of being displaced horizontally.

Figure 13:
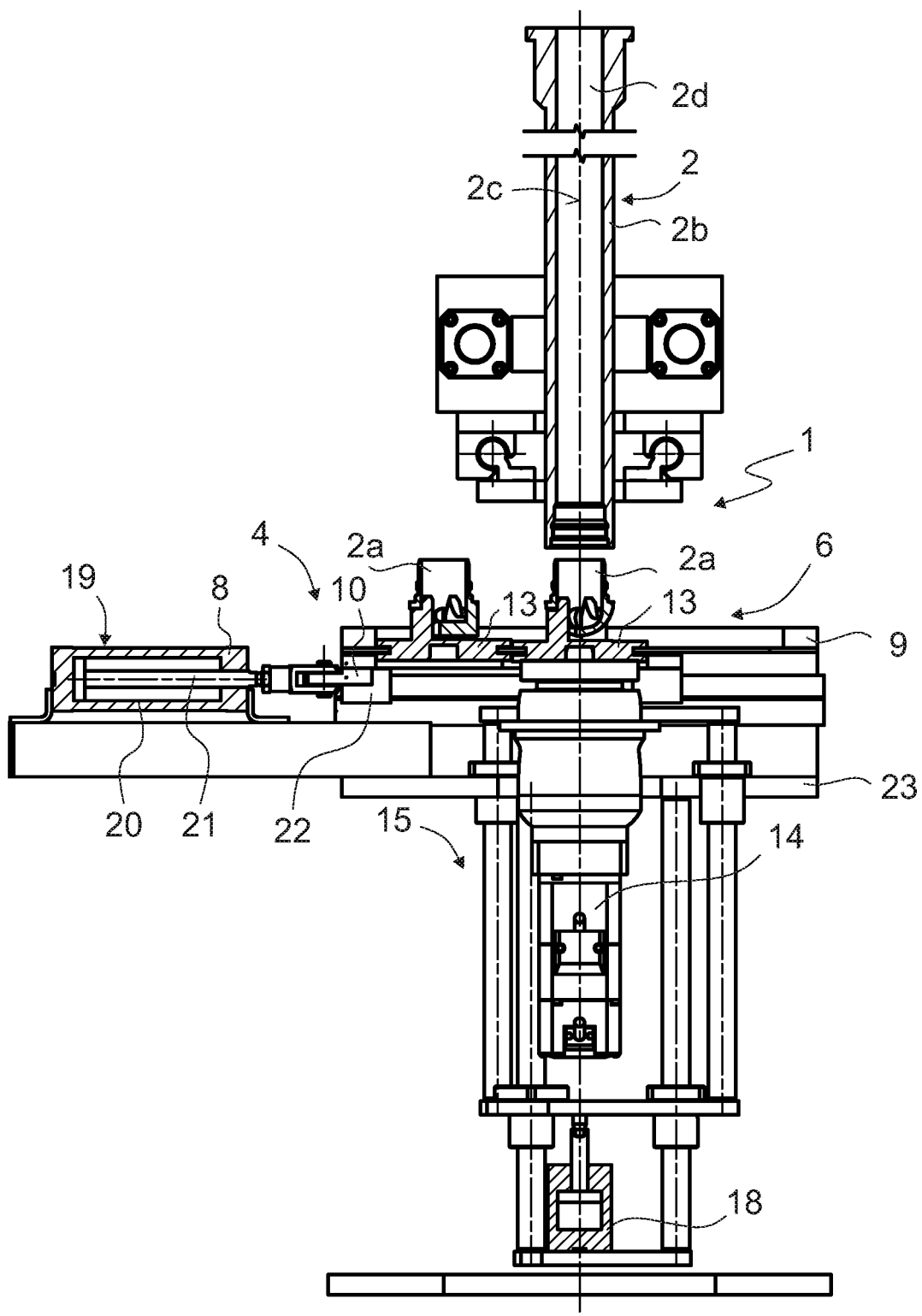
FIG. 13: The device of FIG. 6 in a eighth process step.

In the step shown in FIG. 13, by means of the displacement device 19 the engaging element 13 holding the new cutting component 2a is moved under the tool 2. In addition, the drive unit 14 is coupled to the engaging element 13 by actuating the pneumatic cylinder or spring element 18 correspondingly.

Figure 14:
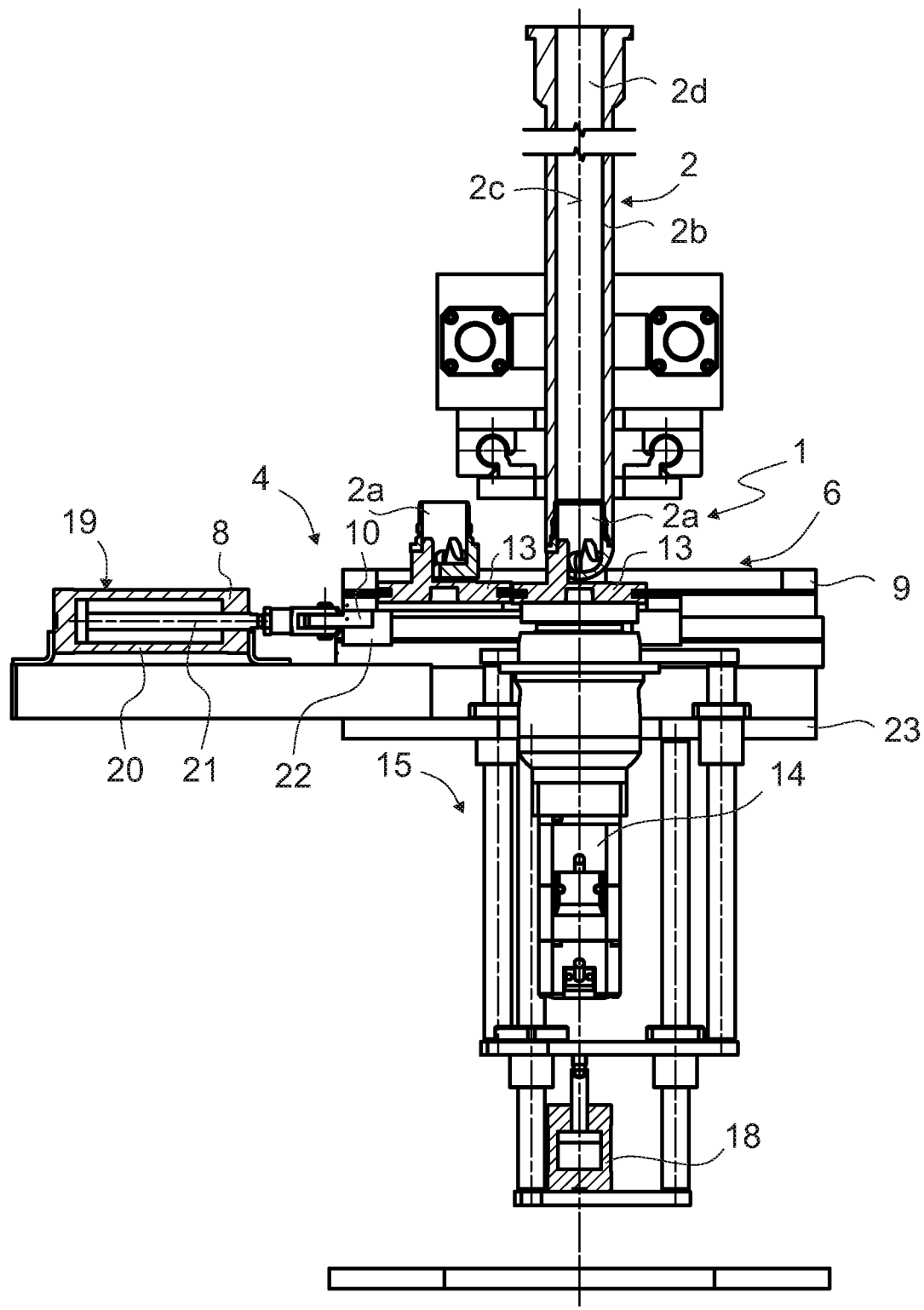
FIG. 14: The device of FIG. 6 in a ninth process step.

FIG. 14 shows the final step for exchanging the cutting component 2a of the rotating tool 2. Here, by virtue of a corresponding actuation of the drive unit 14 the new cutting component 2a has been connected to the part 2b that remains on the tool 2. In this the drive unit 14 is assisted by the spring element 16 in the form of a pneumatic cylinder, so that a sufficient force acts in the direction of the rotational axis 2c in order to be able to fix the cutting component 2a onto the part 2b that remains on the tool 2. The spring element 16 is connected to the drive unit 14 by a coupling element 23.

In an embodiment of the device 1 (not shown) it would be possible in a controlled manner to realize a spindle (not shown) which is part of the drive unit of the tool 2. By means of such a controlled spindle it would be possible, with the spindle, to perform the rotational movement for releasing the cutting component 2a. In that case the engaging element 13 could be made solid. Furthermore, it would be possible to do without the holding device 4, since the relative movement between the cutting component 2a and the tool 2 would be brought about by the tool 2 or the spindle driving it. In principle such an embodiment represents a kinematic reversal of the embodiment described above. The relative movement between the engaging element 13 and the cutting component 2a as well, in the direction of the rotational axis 2c, could be brought about by such a controlled spindle, whereby a movement of the engaging element 13 toward the rotational axis 2c could also be dispensed with.

FIGS. 15 to 22D show various embodiments of the tool 2. As already mentioned above, the tool 2 is a hollow milling tool for machining workpieces made of plastic, which comprises the exchangeable cutting component 2a and the part 2b that remains on the tool 2. In the embodiment shown in FIG. 15 a number of embodiments of the cutting component 2a are illustrated, with which a variety of machining tasks can be carried out on the workpiece. Needless to say, however, many other designs of cutting components 2a and correspondingly adapted designs of the part 2b that remains on the tool 2 are conceivable.

In all the embodiments described here the cutting component 2a and the part 2b that remains on the tool 2 have respective oblique surfaces 24 and 25 that correspond with one another, such that the oblique surface 24 is associated with the cutting component 2a and the oblique surface 25 is associated with the part 2b that remains on the tool 2. Moreover, in the embodiments described here the cutting component 2a and the part 2b that remains on the tool 2 have respective, mutually corresponding mating surfaces 26 and 27 a distance away from the oblique surfaces 24 and 25, with a very small clearance relative to one another. Exact centering and guiding of the cutting component 2a relative to the part 2b that remains on the tool 2 is achieved in this way.

In the present case the oblique surface 24 is on the end of the cutting component 2a facing toward the part 2b that remains on the tool 2, so that by virtue of the contact between the oblique surface 24 and the oblique surface 25 a pre-centering takes place and an exact insertion of the cutting component 2a into the part 2b that remains on the tool 2 is ensured. The exact guiding then takes place during the farther insertion of the cutting component 2a into the part 2b that remains on the tool 2, by means of the two cylindrical mating surfaces 26 and 27, which are as far away as possible from the oblique surfaces 24 and 25.

As already mentioned, all the embodiments of the tool 2 described herein have the mutually corresponding oblique surfaces 24 and 25 and the mutually corresponding mating surfaces 26 and 27.

The differences between the three embodiments of the tool 2 described herein consist in the manner in which the cutting component 2a is connected to the part 2b that remains on the tool 2.

Figure 15:
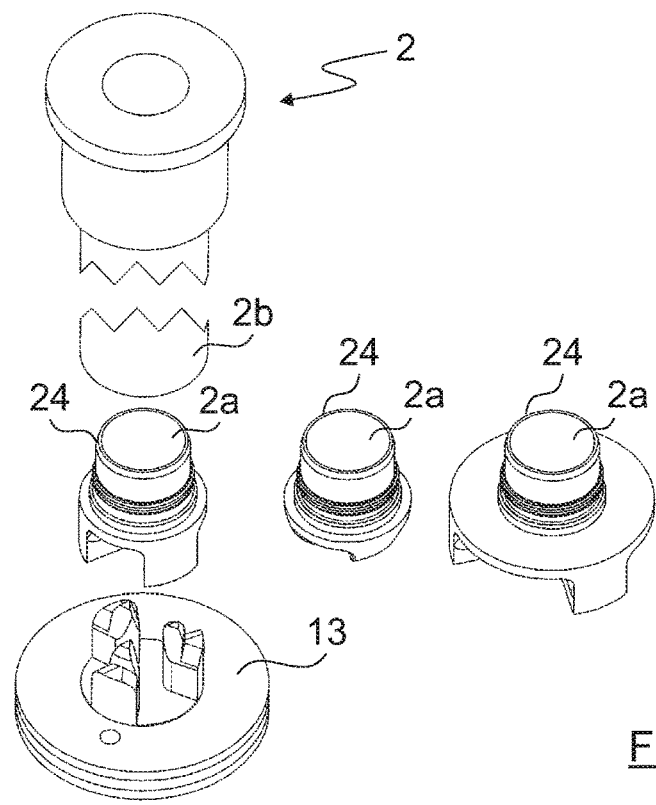
FIG. 15: A first embodiment of a hollow milling tool according to the invention.
Figure 16:
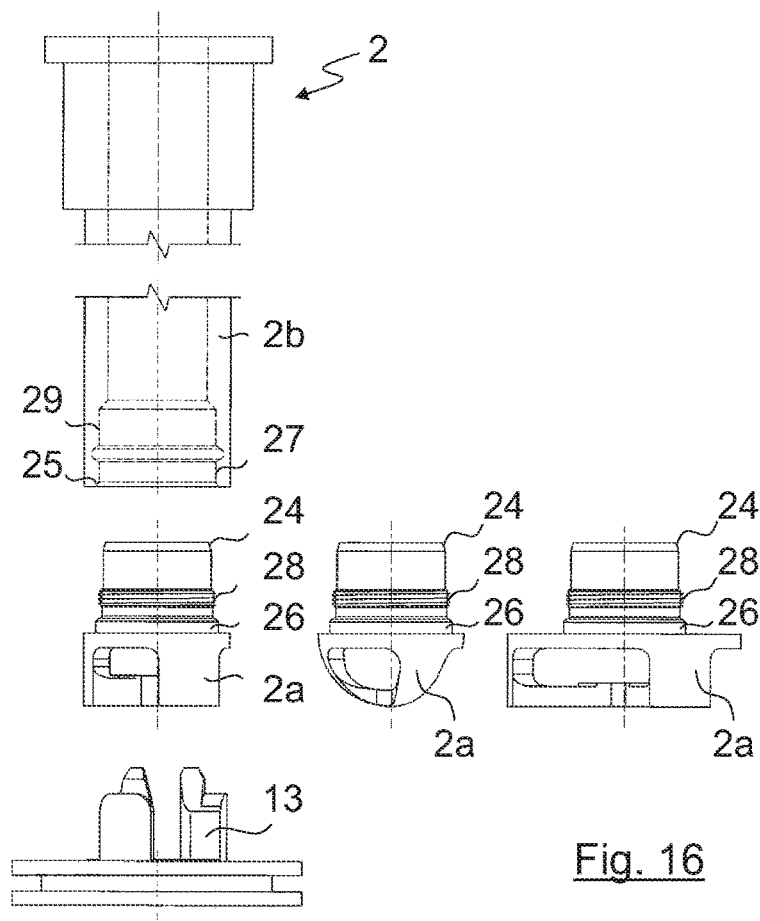
FIG. 16: A side view of the milling tool in FIG. 15.
Figure 17:
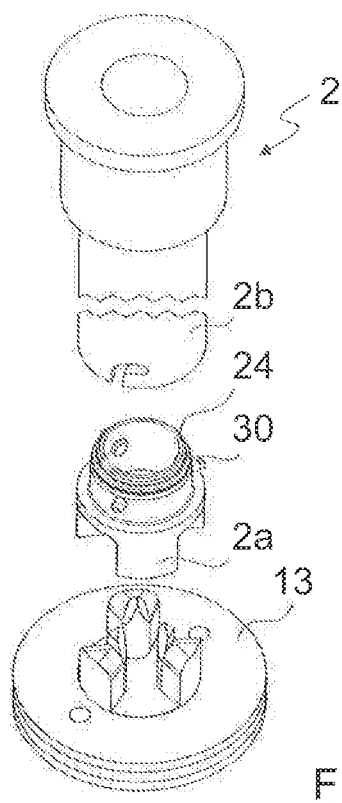
FIG. 17: A second embodiment of a hollow milling tool according to the invention.
Figure 18:
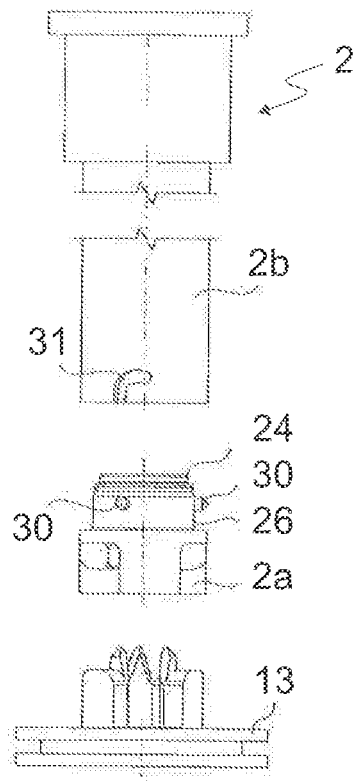
FIG. 18: A side view of the milling tool in FIG. 15.
Figure 19A:
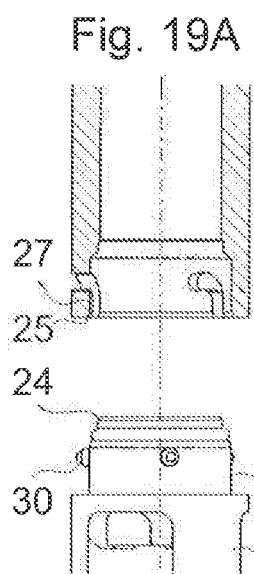
FIGS. 19A-19D: Various conditions during the connection of the cutting component to the part remaining on the tool, in the case of the milling tool according to FIG. 17.
Figure 19B:
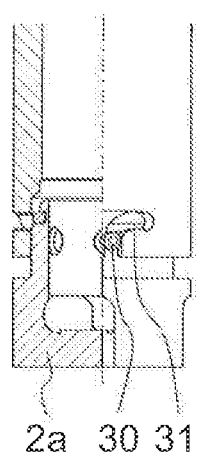
Figure 19C:
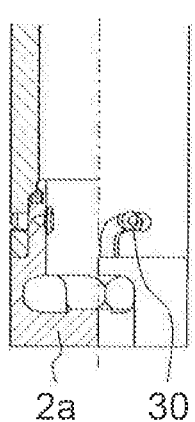
Figure 19D:
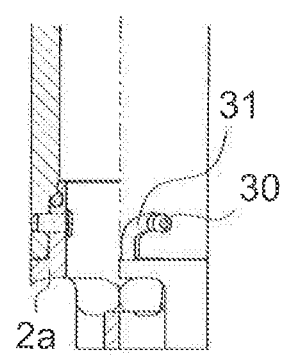

In the embodiment of the tool 2 illustrated in FIGS. 15 and 16, the cutting component 2a has an external thread 28 and the part 2b that remains on the tool 2 has an internal thread 29. Thus, by virtue of the external thread 28 and the internal thread 29 a screw connection is formed, by means of which the cutting component 2a can be connected to the part 2b that remains on the tool 2 and released therefrom. This is made possible simply by rotating the engaging element 13 also shown in FIGS. 15 and 16, with the help of the drive unit 14.

In the embodiment illustrated in FIGS. 17, 18 and 19A-19D, the cutting component 2a and the part 2b that remains on the tool 2 are connected by means of a bayonet connector. In this case the bayonet connector has a number of pins 30 attached to the cutting component 2a and respective grooves 31 provided in the part 2b that remains on the tool 2. Thus, by inserting the pins 30 of the cutting component 2a into the grooves 31 of the part 2b that remains on the tool 2, the cutting component 2a is attached to the part 2b that remains on the tool 2. As with an ordinary screw connection such as the screw connection described in FIGS. 15 and 16, the cutting component 2a is locked onto the part 2b that remains on the tool 2 by rotating the cutting component 2a clockwise. Correspondingly, the cutting component 2a is released from the part 2b that remains on the tool 2 in the counterclockwise direction. To produce this rotational movement of the cutting component 2a relative to the part 2b that remains on the tool 2, the engaging element 13 and the drive unit 14 that rotates it are used.

FIGS. 19A-19D show various conditions during the movement of the cutting component 2a relative to the part 2b that remains on the tool 2, when the cutting component 2a is being attached to the part 2b that remains on the tool 2.

FIGS. 20, 21 and 22A-22D show a further possibility for connecting the cutting component 2a to the part 2b that remains on the tool 2. In this case a locking ball connection is used, which comprises a plurality of locking balls 32 associated with the cutting component 2a and a groove 33 arranged on the part 2b that remains on the tool 2.

As shown in FIGS. 22A-22D, in this embodiment a movement of the cutting component 2a in the direction of the rotational axis 2c of the tool 2 toward the part 2b that remains on the tool 2 allows the cutting component 2a to be introduced into the part 2b that remains on the tool 2. When during this movement the locking balls 32 clip into the groove 33, the cutting component 2a is locked onto the part 2b that remains on the tool 2. Thus, in this embodiment there is no need to rotate the engaging element 13 with which the cutting component 2a is moved, which element is also present in this case. The locking balls 32 can be released from the groove 33 in a manner known as such.

In addition to the connection possibilities illustrated here for connecting the cutting component 2a to the part 2b that remains on the tool 2, other possibilities too can be imagined.

The invention claimed is:

1. A device (1) for exchanging at least one cutting component (2a) of a rotary tool (2) for machining workpieces made of plastic, the device comprising:
    an aligning device (5) for rotating the at least one cutting component (2a) about a rotational axis (2c) of the tool (2), and
    an exchanging device (6) for releasing the at least one cutting component (2a) from a body (2b) of the tool (2) and for attaching another cutting component (2a) to the body (2b) of the tool (2);
    wherein the aligning device (5) comprises means (12) for determining an angular position of the tool (2) about the rotational axis (2c),
    wherein the aligning device (5) further comprises a positioning element (10), the positioning element (10) being a tapered wedge that is movable into one of a plurality of openings (11) formed in the at least one cutting component (2a), and
    wherein moving the positioning element (10) into the one of the plurality of openings (11) causes the at least one cutting component (2a) to be rotated into a position about the rotational axis (2c) at which the exchanging device (6) is able to release the at least one cutting component (2a) from the body (2b) of the tool (2).

2. The device according to claim 1, further comprising a holding device (4) for holding the body (2b) of the tool (2).

3. The device according to claim 2, wherein the holding device (4) is in a form of a floating clamping device.

4. The device according to claim 2, wherein the holding device (4) is a fixing device for a drive unit of the tool (2).

5. The device according to claim 1, wherein the exchanging device (6) comprises at least one engaging element (13) for engaging in the at least one cutting component (2a).

6. The device according to claim 5, wherein the exchanging device (6) comprises a drive unit (14) for rotating the at least one engaging element (13).

7. The device according to claim 5, wherein the exchanging device (6) comprises means (15) for moving the at least one engaging element (13) in a direction of the rotational axis (2c) of the tool (2).

8. The device according to claim 7, wherein the means (15) for moving the at least one engaging element (13) in the direction of the rotational axis (2c) of the tool (2) comprise a spring element (16) for applying force in the direction of the rotational axis (2c) of the tool (2).

9. The device according to claim 5, wherein the exchanging device (6) comprises two engaging elements (13) which are movable toward the tool (2) by a displacement device (19).

10. The device according to claim 1, wherein the aligning device (5) further comprises a second positioning element (10), the second positioning element (10) being a second tapered wedge for rotating the at least one cutting component (2a) about the rotational axis (2c) of the tool (2) into the position at which the exchanging device (6) is able to release the at least one cutting component (2a) from the body (2b).

11. A device (1) for exchanging at least one cutting component (2a) of a hollow milling tool (2) that rotates about a rotational axis and that machines plastic workpieces, the device comprising:
    an alignment device (5) which engages the at least one cutting component (2a) and which rotates the at least one cutting component (2a) about the rotational axis of the milling tool (2) so as to orient the at least one cutting component (2a) into a desired rotational position; and
    an exchanging device (6) that is couplable with the at least one cutting component (2a), the exchanging device (6) being actuatable to remove the at least one cutting component (2a) from a hollow body (2b) of the milling tool (2) and to attach another cutting component (2a) to said hollow body (2b);
    wherein the alignment device (5) comprises a proximity sensor (12) for determining an angular position of the milling tool (2) about the rotational axis (2c),
    wherein the alignment device (5) further comprises a positioning element (10), the positioning element (10) being a tapered wedge that is movable into one of a plurality of openings (11) formed in the at least one cutting component (2a), and
    wherein moving the positioning element (10) into the one of the plurality of openings (11) causes the at least one cutting component (2a) to be rotated into the desired position about the rotational axis (2c), and it is at the desired position where the exchanging device (6) is able to remove the at least one cutting component (2a) from the hollow body (2b).

* * * * *